United States Patent [19]

Incorvia et al.

[11] Patent Number: 5,191,721
[45] Date of Patent: Mar. 9, 1993

[54] MICROWAVE REGENERABLE DESICCANT CARTRIDGE

[75] Inventors: Samuel A. Incorvia, Tonawanda; Joseph L. Iwaniszek, Lancaster, both of N.Y.

[73] Assignee: Multiform Desiccants, Inc., Buffalo, N.Y.

[21] Appl. No.: 767,490

[22] Filed: Sep. 30, 1991

[51] Int. Cl.⁵ .............................................. F26B 3/34
[52] U.S. Cl. .......................................... 34/1 P; 34/80
[58] Field of Search .................... 34/80, 81, 79, 1 P

[56] References Cited

U.S. PATENT DOCUMENTS 4,805,317  2/1989  Inlis et al. .............................. 34/1 Q Primary Examiner—Henry A. Bennet
Attorney, Agent, or Firm—Joseph P. Gastel

[57] ABSTRACT

A microwave-regenerable desiccant cartridge including a casing of transparent plastic, indicating desiccant within the casing, a bottom wall and a top wall in the casing, apertures in the bottom and top walls of the casing of a smaller size than the desiccant within the casing, and outwardly extending legs on both the top wall and the bottom wall to space the apertures in the bottom and top walls from a supporting surface of a microwave oven on which they are placed in facing relationship.

17 Claims, 2 Drawing Sheets

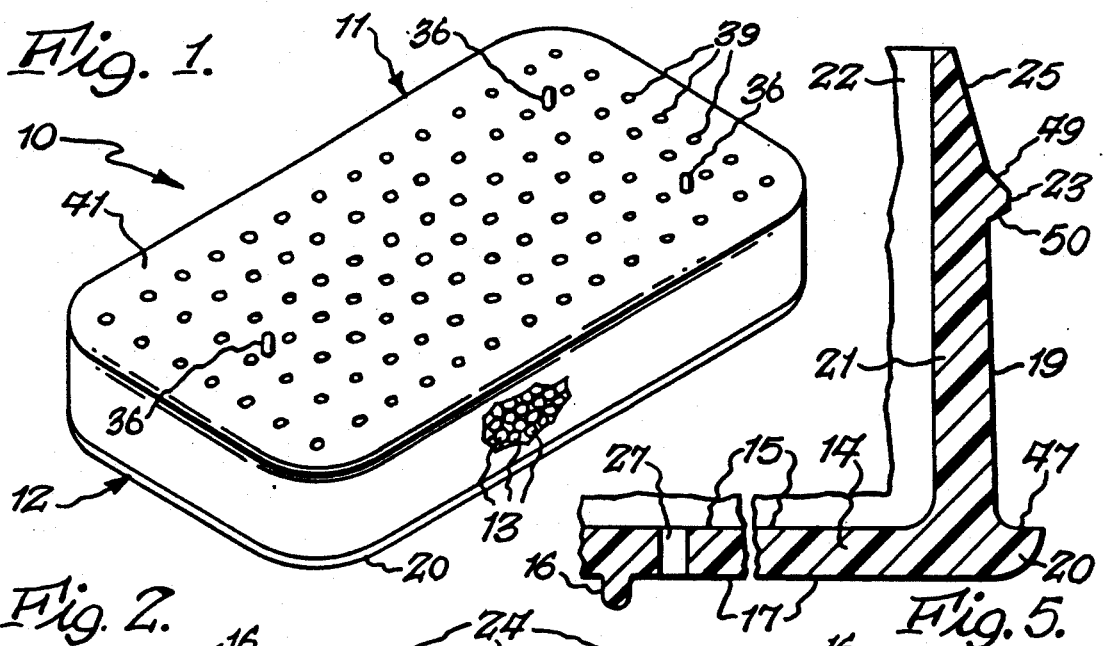
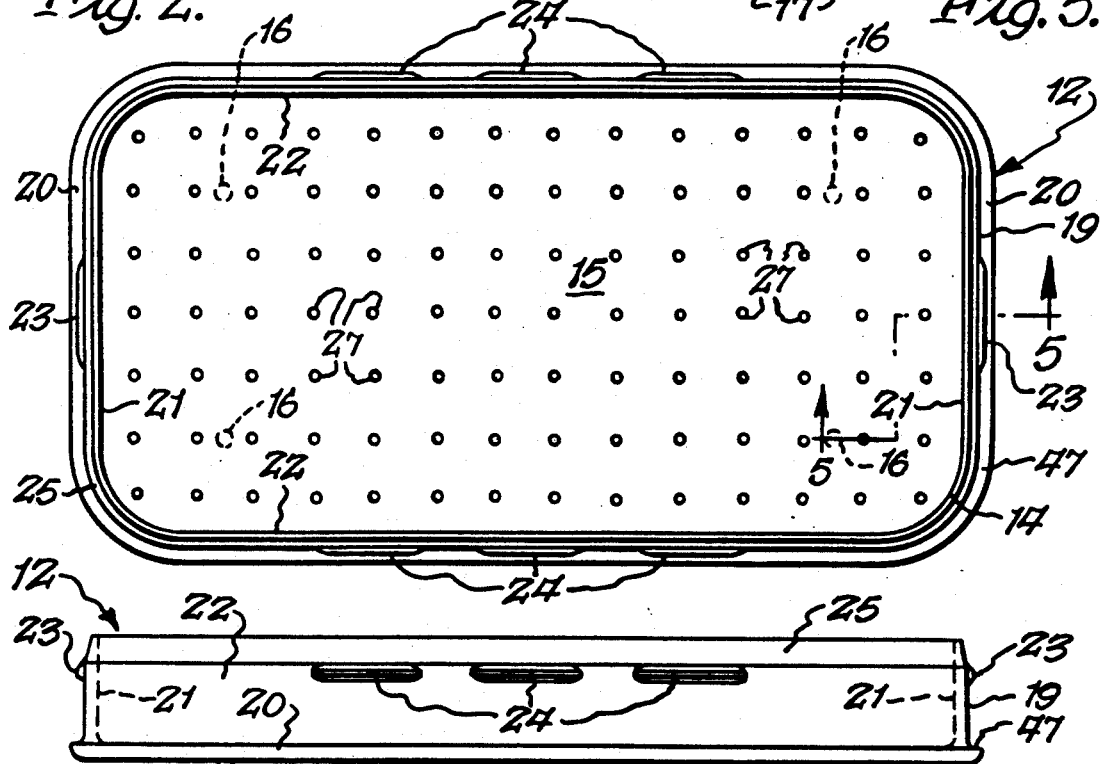
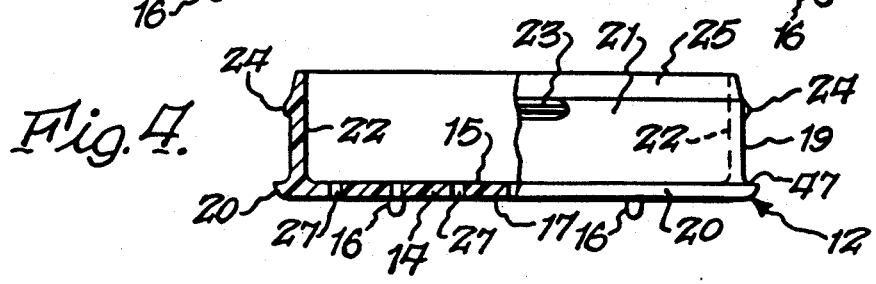

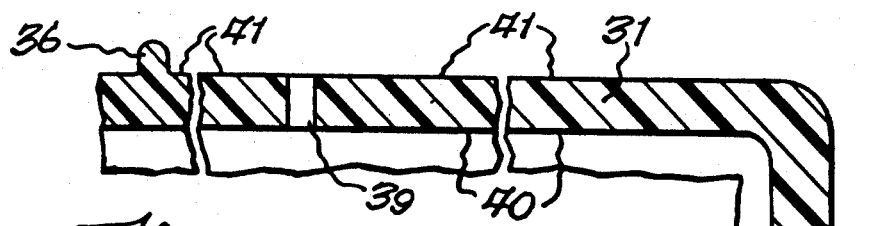
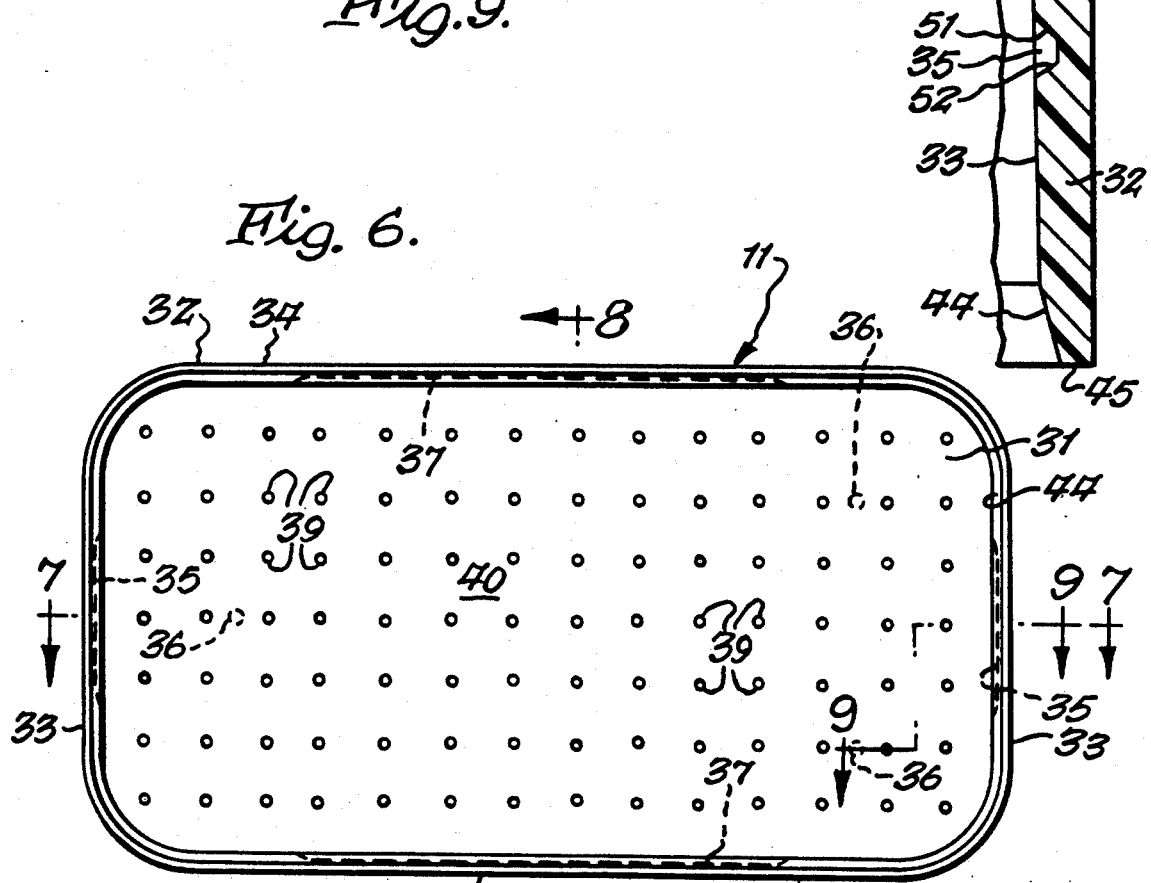
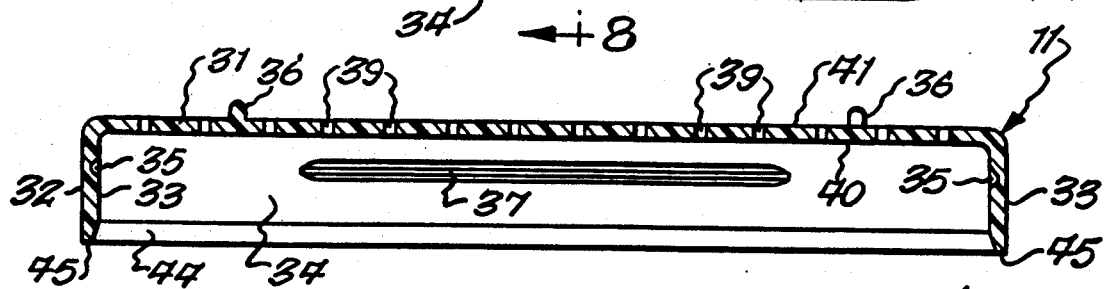
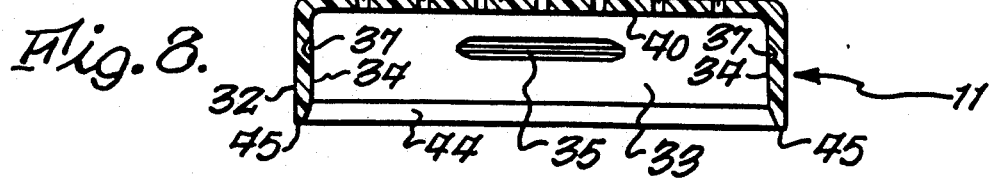

MICROWAVE REGENERABLE DESICCANT CARTRIDGE

BACKGROUND OF THE INVENTION

The present invention relates to a microwave regenerable desiccant cartridge.

By way of background, regenerable desiccant cartridges are known. These cartridges essentially consist of a metal box having a silica gel therein. A plurality of apertures are located in the walls of the box to permit moisture to pass into the box to be adsorbed by the desiccant and to permit the moisture to be driven from the desiccant during regeneration by heating the cartridge in an oven. This oven regeneration takes approximately four hours at 350° F. The metal cartridge cannot be regenerated by microwaving because of the nature of the metal.

SUMMARY OF THE INVENTION

It is accordingly the primary object of the present invention to provide a desiccant cartridge which can be regenerated by microwaving in a few minutes whereas the same size cartridge previously could be regenerated only by being heated in an oven for a period of about four hours.

Another object of the present invention is to provide a microwave regenerable desiccant cartridge which is transparent so that indicating desiccant therein can be viewed to determine its condition.

Yet another object of the present invention is to provide a microwavable desiccant cartridge which is constructed in such a manner so that a base and cover can be conveniently snapped together into a permanent casing.

Yet another object of the present invention is to provide a microwave regenerable desiccant cartridge having apertures in both the top wall and the bottom wall and legs on both the top wall and the bottom wall so that none of the apertures will be obstructed when either the top or bottom wall is laid on a supporting surface in a microwave oven. Other objects and attendant advantages of the present invention will readily be perceived hereafter.

The present invention relates to a microwave regenerable and reusable desiccant cartridge comprising a casing fabricated of plastic which transmits microwave energy without itself being deleteriously affected, apertures in said casing for permitting communication between the inside of said casing and the environment in which said casing is located, and desiccant material within said casing for adsorbing moisture which passes through said apertures from the environment and for being regenerated by microwave energy which drives moisture from said desiccant material through said apertures.

The present invention also relates to a microwave regenerable and reusable desiccant cartridge comprising a casing which transmits microwave energy without being deleteriously affected, top and bottom walls in said casing, desiccant material within said casing, and a plurality of apertures in said top and bottom walls for permitting communication between the inside of said casing and the environment in which said casing is located so as to permit moisture to pass therethrough into the inside of said casing for adsorption by said desiccant and to permit said moisture to be driven out through said apertures during microwave regeneration of said desiccant, and means on both said top wall and said bottom wall for spacing said apertures therein from a supporting surface in a microwave oven when said casing is laid on said supporting surface with either said top wall or said bottom wall facing said surface.

Other objects and attendant advantages of the present invention will readily be perceived hereafter when the following portions of the specification are read in conjunction with the accompanying drawings wherein:

BRIEF DESCRIPTION OF THE DRAWINGS

FIG. 1 is a perspective view of the improved microwavable desiccant cartridge of the present invention;

FIG. 2 is a top plan view of the base of the desiccant cartridge;

FIG. 3 is a side elevational view of the base;

FIG. 4 is an end elevational view, partially in cross section, of the base;

FIG. 5 is an enlarged fragmentary cross sectional view, taken substantially along line 5—5, showing various details of the base;

FIG. 6 is a bottom plan view of the cover of the cartridge shown in FIG. 1;

FIG. 7 is a cross sectional view taken substantially along line 7—7 of FIG. 6;

FIG. 8 is a cross sectional view taken substantially along line 8—8 of FIG. 6; and FIG. 9 is a fragmentary enlarged cross sectional view taken substantially along line 9—9 of FIG. 6 showing various details of the cover.

DESCRIPTION OF THE PREFERRED EMBODIMENTS

The microwave regenerable desiccant cartridge 10 of the present invention includes a cover 11 which is snap-fitted onto a base 12 to retain desiccant pellets 13 therein. Both the cover and the base are fabricated of plastic which will not be deleteriously affected during the microwaving. A plastic which has been found satisfactory is marketed under the trademark ULTEM Grade 1000 by the General Electric Company. This plastic is also transparent so that the pellets 13 can be viewed therethrough, which is especially practical so that the condition of desiccant pellets 13 can be observed. In this respect, it is preferable to use indicating silica gel which is blue when it is in condition to adsorb moisture and which turns pink when it is saturated.

Base 12 includes a lower wall 14 having an inner surface 15 and an outer surface 17. A peripheral flange 19 extends upwardly from wall 14. A bordering flange 20 extends around base 14 and is essentially coextensive therewith. Flange 19 consists of a pair of short walls 21 and a pair of long walls 22. The walls 21 and 22 merge into each other, as shown in the drawings. A protuberance or boss 23 is located on the outer surface of each wall 21. A plurality of protuberances or bosses 24 extend outwardly from each wall 22. Each of these protuberances are of the configuration shown in FIG. 5. The end of flange 19 remote from wall 14 is tapered, as shown at 25 in FIG. 5, with the taper leading to the protuberances 23 and 24. The flange 19 between the protuberances 21 and 23, on one hand, and wall 14, on the other hand, is slightly tapered, as shown in FIG. 5.

A plurality of cylindrical apertures 27 are formed in wall 14. A plurality of legs 16 extend outwardly from the outer surface 17 of the bottom wall 14 to thereby space the apertures in the bottom wall from a supporting surface of a microwave oven when the casing is laid on the supporting surface with the bottom wall facing this surface.

The cover 11 of cartridge 10 includes a top wall 31 having a peripheral flange 32 depending therefrom which includes relatively short portions 33 and relatively long portions 34 which are joined as shown in FIG. 6. Flange 32 is of slightly larger size than flange 19 of the base so that it will fit over it with a sliding fit and provide a good tight joint therewith after desiccant has been placed into the base. Flange portions 33 have grooves 35 therein. Flange portions 34 have elongated grooves 37 therein. The cross sectional configuration of grooves 35 is shown in FIG. 9. Grooves 37 have the same cross sectional configuration as grooves 35.

A plurality of cylindrical apertures 39 extend between inner surface 40 and outer surface 41 of top wall 31. These apertures are identical to apertures 27 of bottom wall 14. A plurality of legs 36 extend outwardly from the outer surface 41 of the top wall 31 to thereby space the apertures in the top wall from a supporting surface in a microwave oven when the casing is laid on the supporting surface with the top wall facing this surface.

When the cover 11 is assembled with base 12, the flanges 32 and 19, respectively, fit together with a tight fit, as expressed above. Furthermore, during the assembling process, the tapered portion 44 of flange 32 slides over the tapered portion 25 of flange 19. When the bottom edge 45 of flange 32 abuts ledge 47 of flange 20, the protuberances 23 will have entered grooves 35, and protuberances 24 will have entered grooves 37. Entry of the protuberances into the grooves is by means of a cammed snap-fit. As can be seen from FIG. 5, the surfaces 49 of protuberances 23 are at a greater slope than surfaces 50 thereof. Surfaces 49 will be in contiguous abutting relationship with surfaces 51 of grooves 35 and surfaces 50 will be in abutting relationship with surfaces 52 of grooves 35. As can be seen from FIGS. 5 and 9, the slopes of surfaces 50 and 52 are relatively shallow to preclude the separation of the flanges 19 and 32 after they have been assembled. The relatively steep slope of surfaces 49 permits cover flange 32 to slide over the protuberance 23 during the assembly process. While the configurations of protuberance 23 and groove 35 has been shown only in FIGS. 5 and 9, it will be appreciated that all of the protuberances and all of the grooves have the same cross sectional configuration.

As stated above, prior desiccant cartridges were fabricated of metal and had holes therein which were of the size which prevented the desiccant from falling out of the cartridge and which were sufficiently large to permit moisture to enter the cartridge and also be driven from the desiccant when it was regenerated in an oven. Since this regeneration normally took approximately four hours at about 350° F., the moisture was driven out of the desiccant at a very slow rate, and thus even though the holes were relatively small, there was no water-vapor pressure build-up in the cartridge. Furthermore, as also indicated above, metal could not be microwaved.

In accordance with the present invention, the casing of the cartridge is fabricated from microwavable plastic, which permits the desiccant to be regenerated in a microwave oven in approximately twelve minutes. However, during this rapid regeneration, a large volume of water vapor is generated in a very short period of time, and it has to escape from the inside of the cartridge. If the pressure of the water vapor is not released quickly enough, the vapor pressure within the container will increase, which, in turn, will counter the formation of additional water vapor. Furthermore, if the vapor pressure becomes sufficiently high, it could create undesirable stresses on the container itself. Accordingly, as noted above, the top wall 31 has a plurality of outwardly extending legs 36 and bottom wall 14 has a plurality of legs 16. Thus, when the casing is laid on the shelf of a microwave oven with either the top wall 31 or the bottom wall 14 facing the surface, the legs on that wall will space it from the shelf surface so that the apertures in that wall will remain unobstructed so water vapor may pass through these apertures as well as the apertures in the casing wall which is not adjacent the shelf of the microwave oven.

It is necessary that the apertures in the cartridge should be of relatively small diameter so as to prevent passage of the desiccant through the walls. In the specific embodiment disclosed, the apertures are 0.060 inches in diameter. There are 196 apertures in the cartridge which has a volume of approximately 4 cubic inches and is intended to contain approximately 5 grams of silica gel beads which can adsorb about 16 grams of water. The desiccant which has been used is silica gel beads having a diameter of approximately 0.125 inches. However, it is envisioned that other desiccants can be utilized, such as activated clay or calcium sulfate.

While a specific plastic has been disclosed, it will be appreciated that other suitable plastics which are not deleteriously affected by microwaving may also be used.

It can thus be seen that the microwave regenerable desiccant cartridge of the present invention is manifestly capable of achieving the above-enumerated objects and while preferred embodiments of the present invention have been disclosed, it will be appreciated that it is not limited thereto but may be otherwise embodied within the scope of the following claims.

What is claimed is:

1. A microwave regenerable and reusable desiccant cartridge comprising a casing fabricated of plastic which transmits microwave energy without itself being deleteriously affected, apertures in said casing for permitting communication between the inside of said casing and the environment in which said casing is located, desiccant material within said casing for adsorbing moisture which passes through said apertures from the environment and for being regenerated by microwave energy which drives moisture from said desiccant material through said apertures, said casing having two opposing walls which are larger than the side walls thereof, and said apertures being located in said opposing walls.

2. A microwave regenerable and reusable desiccant cartridge as set forth in claim 1 wherein said casing is fabricated from transparent plastic which permits viewing of said desiccant from outside of said casing.

3. A microwave regenerable and reusable desiccant cartridge as set forth in claim 2 wherein said plastic is a polycarbonate.

4. A microwave regenerable and reusable desiccant cartridge as set forth in claim 2 wherein said desiccant is of the indicating type which has different colors when dry and when it has absorbed moisture.

5. A microwave regenerable and reusable desiccant cartridge comprising a casing fabricated of plastic which transmits microwave energy without itself being deleteriously affected, apertures in said casing for permitting communication between the inside of said casing and the environment in which said casing is located, desiccant material within said casing for adsorbing moisture which passes through said apertures from the environment and for being regenerated by microwave energy which drive moisture from said desiccant material through said apertures, said cartridge comprising a first section with a first wall and a first peripheral flange depending therefrom, a second section with a second wall and a second peripheral flange depending therefrom, said first flange being of slightly larger perimeter than said second flange to receive said second flange with a sliding fit, and detent means for holding said first and second peripheral flanges in assembled relationship with said first and second walls located in facing relationship.

6. A microwave regenerable and reusable desiccant cartridge as set forth in claim 5 wherein said apertures are located in said walls.

7. A microwave regenerable and reusable desiccant cartridge as set forth in claim 6 wherein said casing is fabricated from transparent plastic which permits viewing of said desiccant from outside of said casing.

8. A microwave regenerable and reusable desiccant cartridge as set forth in claim 7 wherein said desiccant is of the indicating type which has different colors when dry and when it has absorbed moisture.

9. A microwave regenerable and reusable desiccant cartridge comprising a casing which transmits microwave energy without being deleteriously affected, top and bottom walls in said casing, desiccant material within said casing, and a plurality of apertures in said top and bottom walls for permitting communication between the inside of said casing and the environment in which said casing is located so as to permit moisture to pass therethrough into the inside of said casing for adsorption by said desiccant and to permit said moisture to be driven out through said apertures during microwave regeneration of said desiccant, and means on both said top wall and said bottom wall for spacing said apertures therein from a supporting surface in a microwave oven when said casing is laid on said supporting surface with either said top wall or said bottom wall facing said surface.

10. A microwave regenerable and reusable desiccant cartridge as set forth in claim 9 wherein said casing is fabricated from transparent plastic which permits viewing of said desiccant from outside of said casing.

11. A microwave regenerable and reusable desiccant cartridge as set forth in claim 10 wherein said plastic is a polycarbonate.

12. A microwave regenerable and reusable desiccant cartridge as set forth in claim 10 wherein said desiccant is of the indicating type which has different colors when dry and when it has absorbed moisture.

13. A microwave regenerable and reusable desiccant cartridge as set forth in claim 9 wherein said cartridge comprises a first section with a first wall and a first peripheral flange depending therefrom, a second section with a second wall and a second peripheral flange depending therefrom, said first flange being of slightly larger perimeter than said second flange to receive said second flange with a sliding fit, and detent means for holding said first and second peripheral flanges in assembled relationship with said first and second walls located in facing relationship.

14. A microwave regenerable and reusable desiccant cartridge as set forth in claim 13 wherein said casing is fabricated from transparent plastic which permits viewing of said desiccant from outside of said casing.

15. A microwave regenerable and reusable desiccant cartridge as set forth in claim 14 wherein said desiccant is of the indicating type which has different colors when dry and when it has absorbed moisture.

16. A microwave regenerable and reusable desiccant cartridge as set forth in claim 9 wherein said casing is fabricated of plastic.

17. A microwave regenerable and reusable desiccant cartridge comprising a casing which transmits microwave energy without being deleteriously affected, top and bottom walls in said casing, desiccant material within said casing, and a plurality of apertures in said top and bottom walls for permitting communication between the inside of said casing and the environment in which said casing is located so as to permit moisture to pass therethrough into the inside of said casing for adsorption by said desiccant and to permit said moisture to be driven out through said apertures during microwave regeneration of said desiccant, and means on said casing for spacing said apertures on both said top wall and said bottom wall from a supporting surface in a microwave oven when said casing is selectively supported on said supporting surface for microwave regeneration.

* * * * *